Aug. 1, 1950     M. DISHAL     2,516,858
WIDE RANGE PHASE METER
Filed March 29, 1947     2 Sheets-Sheet 1

INVENTOR.
MILTON DISHAL
BY
*Robert Harding Jr*
ATTORNEY

Aug. 1, 1950   M. DISHAL   2,516,858
WIDE RANGE PHASE METER
Filed March 29, 1947   2 Sheets-Sheet 2

INVENTOR.
MILTON DISHAL
BY
*Robert Harding Jr.*
ATTORNEY

Patented Aug. 1, 1950

2,516,858

UNITED STATES PATENT OFFICE 2,516,858

WIDE RANGE PHASE METER

Milton Dishal, Nutley, N. J., assignor to Federal Telecommunication Laboratories Inc., New York, N. Y., a corporation of Delaware Application March 29, 1947, Serial No. 738,173

11 Claims. (Cl. 172—245)

This invention relates to phase meters, and more particularly to a meter of the type which utilizes a cathode ray tube oscilloscope for indicating by means of a controllable image pattern the phase angle between two alternating voltages of the same frequency which are to be compared.

It is a principal object of my invention to provide a phase meter of simple construction which will indicate a given phase angle between two alternating voltages of the same frequency.

Another object is to provide means for indicating the phase difference between two alternating voltages of any frequency within a range of from a fraction of a cycle per second up to several megacycles per second.

Still another object is to provide a flexibly controllable indicating instrument which may be used either as a phase meter or as a frequency meter over a wide range of frequencies.

Then again, it is an object of the invention to provide a sweep circuit for a cathode ray tube oscilloscope suitable for producing different patterns of images which can readily be interpreted to indicate a phase difference between two alternating voltages.

One other object to be specifically mentioned is that my invention is intended to provide a sweep circuit for a cathode ray tube oscilloscope and an adjustable phase shifter for changing the image pattern which is produced by deflecting the electron beam, the control device for the phase shifter being provided with a scale which is calibrated in terms of frequency of an input voltage, and which gives a direct frequency reading with respect to a given A. C. source that produces a predetermined image pattern.

Other objects of my invention will be made clear in the more detailed description to follow. The advantages of the invention will also be made apparent to those skilled in the art.

Figures 1, 2:
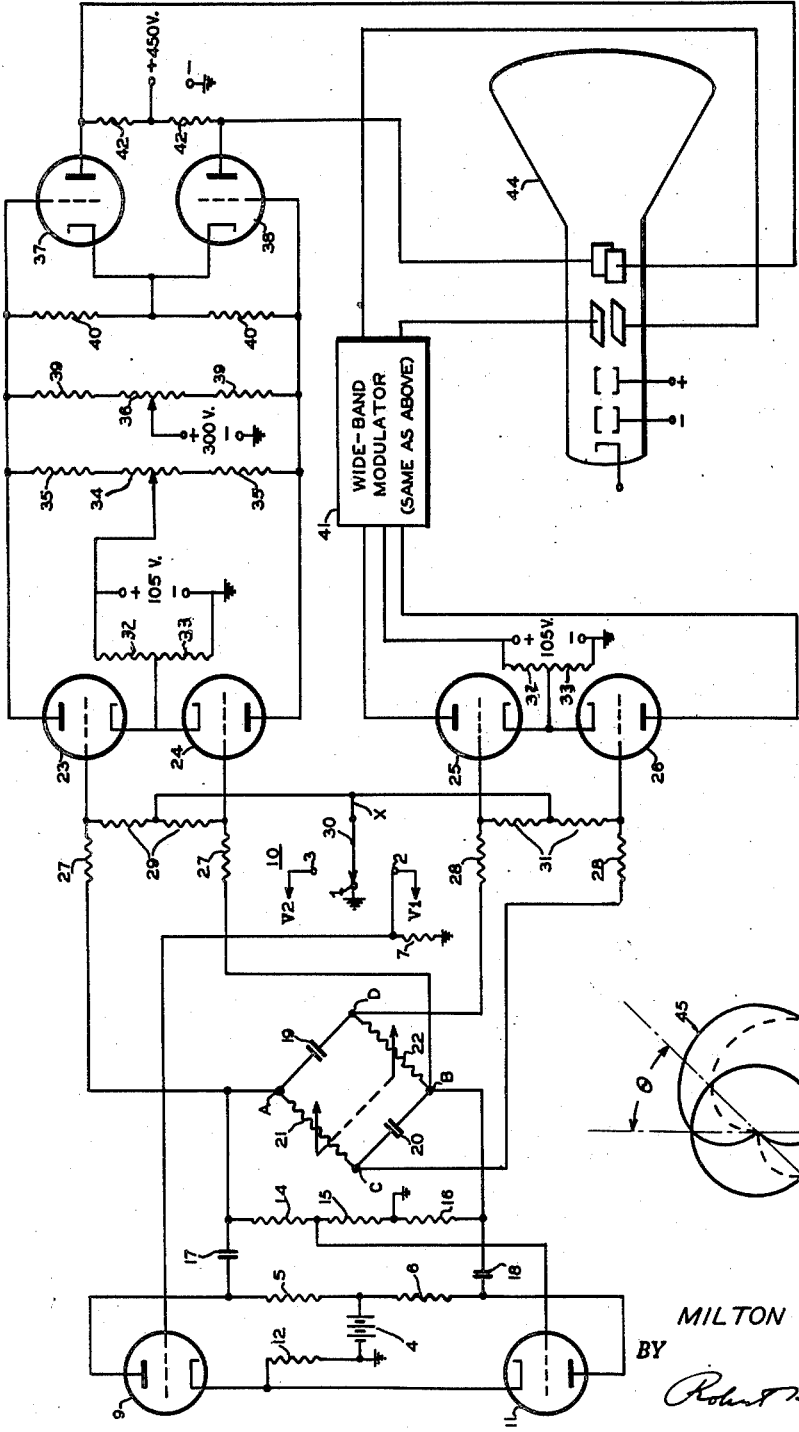
Figure 3:
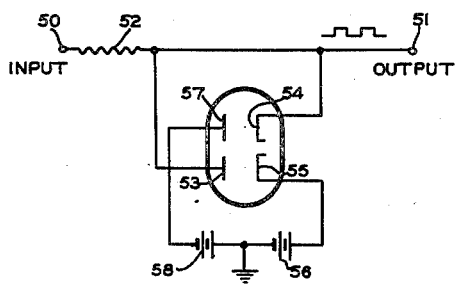
Figure 4:
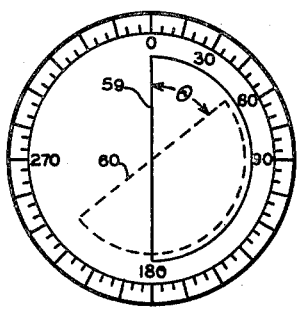
Figure 5:
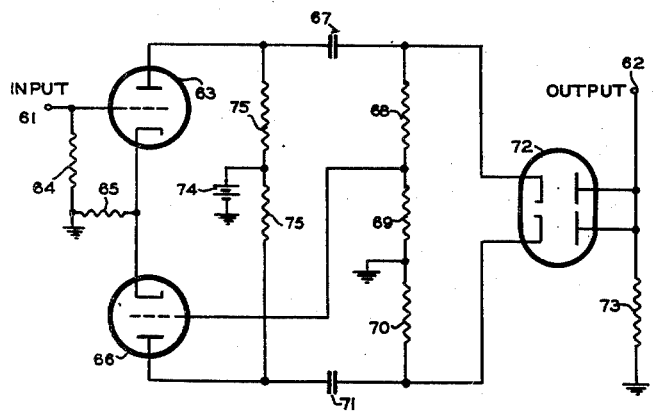
Figure 6:
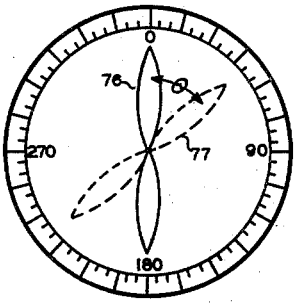

This description is accompanied by a drawing in which Fig. 1 shows diagrammatically a preferred circuit arrangement for carrying out the invention; Fig. 2 shows the configuration of an image pattern when two voltages are impressed upon the sweep circuits of an oscilloscope, these voltages being switched successively into the circuits for the purpose of measuring the phase angle between the two voltages; Fig. 3 shows a detail of circuit structure which may be introduced into a given part of the circuit arrangement of Fig. 1 for the purpose of producing a modified image pattern on the oscilloscope screen; Fig. 4 shows the form of said image pattern; Fig. 5 shows another detail of circuit structure which may alternatively be introduced into the circuit of Fig. 1 at the same point where the elements of Fig. 3 might also be introduced, but in substitution therefor, the added circuit arrangement being such as to give full wave rectification of the modulating voltages; and Fig. 6 shows the configuration of the beam deflection when using the added circuit structure of Fig. 5.

Referring first to Fig. 1, I show therein two triode discharge tubes 9 and 11, each having a cathode, a control grid and an anode. The cathodes are interconnected, and are provided with a common cathode resistor 12 leading to ground. Anode potential is supplied by means of a direct current source 4, the positive terminal of which is connected to each of the anodes in tubes 9 and 11 through branched resistors 5 and 6. It will, of course, be understood that in place of the triode tubes 9 and 11 I may, if desired, use pentode or other multi-grid tubes. Tubes 9 and 11 in combination with a 90° phase-shifting network presently to be described are used to obtain two balanced circle-producing waves, to be applied to the beam-deflecting means of a cathode ray oscilloscope. Tube 11 operates as a phase inverter with respect to, and under control of, the output from tube 9.

The control grid in tube 9 is provided with a grid resistor 7 leading to ground. This grid may be directly controlled by an alternating voltage V1 fed thereto through an input terminal 2. This terminal 2 is one of three selectible terminals of a switch 10 wherein the other two terminals are designated 1 and 3. Switch terminal 3 is also an input terminal which receives a second alternating potential V2. The phase difference in degrees is to be determined by reception of the two waves V1 and V2.

Since discharge tube 11 has for its function to invert the phase of the voltage impressed upon tube 9, the control grid of tube 11 is coupled to the anode of tube 9, through a resistor 14 and a capacitor 17. Resistor 14 is in series with another resistor 15 leading to ground. The output circuit of tube 11 includes a coupling capacitor 13 and a resistor 16 leading to ground.

Push-pull operation of tubes 9 and 11 is utilized to control a push-pull amplifier which comprises triode discharge tubes 23 and 24. Simultaneously the output from tubes 9 and 11 is shared by a phase-shifting network having input terminals A and B, and output terminals C and D. This network is of conventional design. It comprises a bridge arrangement having four arms, of which the arms 21 and 22 are adjustable resistors while the arms 19 and 20 capacitors. Gang-control of the resistors is provided in order to maintain the network in balance and to adjust the same for obtaining a phase shift of 90° at any desired frequency within the range of operation of the complete circuit.

Network terminals A and B are connected through resistors 27 to the respective grids in tubes 23 and 24. Network terminals C and D are likewise connected through resistors 28 to the respective grids in tubes 25 and 26. Grid resistors 29 are provided for the input circuits of tubes 23 and 24. Similar grid resistors 31 are also provided for the input circuits of tubes 25 and 26.

The junction between the two resistors 29 and the junction between the two resistors 31 are tied together and both are connected to a movable switch arm 30 in switch 10. This is a 3-position switch the terminal 1 of which is grounded, while terminals 2 and 3 are connected respectively to sources V1 and V2, the phases of which are to be compared for measuring their phase difference, as previosuly stated.

The tubes 23 and 24 have their cathodes connected to an intermediate point on a voltage divider consisting of resistors 32 and 33. The extremities of this voltage divider are connected across the terminals of a direct current source of, say, 105 volts, the negative terminal being grounded. The anodes in these tubes are fed with direct current potential from said source, connections thereto being made through a balancing rheostat 34, the terminals of which are connected respectively to anode resistors 35.

In order to provide direct current coupling between successive stages of amplification in the deflecting circuit, the anodes in tubes 23 and 24 are connected respectively with control grids in a second stage of amplifier tubes 37 and 38. The grids in tubes 37 and 38 are provided with grid resistors 40 leading to the interconnected cathodes of these tubes. The anodes are fed with direct current potential from a direct current source of, say, 450 volts, the negative terminal of which is grounded. If, however, a single D. C. source is provided for all requirements, then, by means of a voltage divider, or by separate sections of interconnected batteries, taps may be availed of for supplying the necessary anode potentials to different stages of the circuit. In order to simplify the drawing, however, separate sources are shown. The 450 volt source is connected through resistors 42 to the anodes in the tubes 37 and 38. These anodes, however, are directly connected to the deflecting plates, say for vertical deflection of the electron beam in the cathode ray tube 44.

A two-stage balanced push-pull modulator is constituted by the tubes 23, 24, 37, and 38. The mode of operation and the adjustment of balances in this circuit arrangement are substantially in accordance with the teachings to be found in a co-pending application filed by myself jointly with J. S. Le Grand, Ser. No. 608,948, which was filed August 4, 1945, now Patent No. 2,462,849, issued March 1, 1949. As shown in that application, it is important to provide compensating means whereby discrepancies between the characteristics of the two tubes 23 and 24 or between the two tubes 37 and 38 may be corrected. Maintenance of balance in the circuit is particularly difficult when modulation voltages are applied thereto, as is necessary in the instant case for observing the phase difference between two wave sources. When the modulation potentials are such as to shift the bias on the two tubes of the push-pull pair co-phasally and to swing the grid bias from zero to cut-off, one must adjust not only the normal bias on the two tubes but also the load circuit which interconnects their anodes so that a balance will be obtained over the entire range of operation of the system. Accordingly, independent means of adjustment are provided both for the normal bias between the cathodes and the control grids and also to balance the load on each tube with respect to the other. Here I use a divided load resistor 34—35 interconnecting the anodes.

A fixed source of biasing potential may be provided by connecting the common cathode lead for tubes 23 and 24 to an intermediate point on a voltage divider consisting of resistors 32 and 33, the outer extremities of which are connected across the terminals of the 105 volt direct current source. As previously stated, the positive terminal of this source is connected to the anodes of tubes 23 and 24 through resistive elements 34 and 35. However, since the element 34 is a potentiometer interposed between the two elements 35 of equal value, any adjustment which may be necessary to balance the loads can be accomplished by varying the position of the movable arm on potentiometer 34. Furthermore, the relative bias on the two tubes can be varied by provision of a movable tap on resistors 32 and 33 considered as a single potentiometric element which serves as a cathode resistor for both cathodes.

The biases on the grids of tubes 37 and 38 may be balanced by means of two resistive elements 35 and an interposed potentiometer 36. The movable tap on potentiometer 36 is connected to the positive terminal of a 300 volt D. C. source, the negative terminal of which may be grounded. The ohmic values of the elements 36 and 39 are very high in comparison with those of the load resistor circuit 34—35. Consequently, there is a negligible bleeder current which flows from the positive terminal of the 300 volt source to the positive terminal of the 105 volt source. Nevertheless the grid biases on the tubes 37 and 38 may readily be balanced by varying the position of the arm on potentiometer 36, and this balance is obtained independently of the values of output currents from the respective tubes 23 and 24.

The prime function of the potentiometer 36 is to center the beam in the cathode ray tube for one component of the deflection. A corresponding centering function is also provided by a like potentiometer in the push-pull modulator amplifier 41 which serves to control the transverse component of beam deflection. These potentiometers when properly adjusted serve also to equalize the anode potentials in the two tubes of each push-pull pair.

In order to produce a circular trace of beam deflection when the control potentials are unmodulated, triode discharge tubes 25 and 26 supply a transverse component of deflecting potentials. These tubes and the subsequent stage 41 which they control are similar in every respect to what has been described above in reference to the tubes 23, 24, 37 and 38.

It will thus be seen that where a 90° phase shifting operation is performed by the phase shifting network (there being no modulation of the deflecting voltages) a circular path will be traced by the electron beam in response to these deflecting voltages. In case an elliptical pattern of electron beam trace should appear, due to maladjustment of the phase shifting network, then the circular pattern may be restored by a corrective adjustment of resistors 21 and 22. This adjustment is also necessary in order to compensate for different phase displacements that are caused by different input frequencies.

When switch arm 30 in switch 10 is set on the ground contact 1 no modulation of the input voltages takes place. An input voltage V1, which is to be considered the reference voltage for phase angle measurement, will be fed to the control grid in tube 9 and will supply an alternating potential to be amplified in tube 23. At the same time tube 11 will invert the phase of the input voltage and supply it in the same manner to the control grid in tube 24. Now with no modulation present (because switch arm 30 is grounded) a circular pattern will be traced on the screen of the oscilloscope.

Surrounding the oscilloscope screen is a circular scale marked in degrees from 0° through 360°. It is preferable to have this scale mounted for rotative adjustment so that the 0° mark may be positioned wherever it is found that a reference axis exists when produced by the incoming voltage V1.

In order to indicate the 0° axis the voltage V1 must not only be applied to the push-pull tubes 9 and 11, but must also be directed co-phasally into the tubes 23, 24, 25 and 26 as modulation potentials. Hence, for this purpose the switch arm 30 is thrown to contact 2. Thereupon the modulation voltage is combined with the output from the amplifier tubes 9 and 11 to produce 100% modulation of the deflecting potentials, so that the pattern traced by the electron beam will now assume the form of a cardioid, as shown by the curve 45 in Fig. 2. It will be readily understood that the cardioid pattern is traced as a resultant of the push-pull potentials applied to the grids of the tubes in each push-pull pair, one pair being in phase quadrature with respect to the other, and both pairs being subjected to co-phasal modulation by sine wave potentials delivered to all of the grids through the switch arm 30, the latter being set on contact 2 or 3 according to the source V1 or V2 which is to be indicated.

The points where the cardioid intersects the circular trace made by the unmodulated voltage are diametrically opposed, so that a line drawn through these points of intersection (when source V1 controls) may be considered the 0° angle.

Now if the switch arm 30 is shifted to contact 3 the phase of a second alternating voltage V2 may be indicated for comparison with voltage V1. At this time, also, the modulation of the deflecting potentials is complete and results in the tracing of a pattern 46, the curve for which is indicated in Fig. 2 by a broken line. Now the points of intersection of curve 46 with the circle define an axis which may be projected onto the annular scale surrounding the oscilloscope screen at a point which may be read as the angle $\theta$ of phase difference between the two waves V1 and V2.

In place of a manually settable switch 10, electronic switching means may be provided, and the rapidity of switching from contact 2 to contact 3 may be made so rapid as to take advantage of the persistence of vision, or else a slow decay period in the luminescence of the screen, so that both patterns 45 and 46 will appear thereon simultaneously. Electronic switching means suitable for this purpose are well known in the art and, therefore, need not be described or illustrated herein.

Referring now to Fig. 3 I show therein a supplemental circuit arrangement which may be introduced at the point X in Fig. 1. The supplemental circuit comprises an input terminal 50 and an output terminal 51. Between these terminals is a resistor 52. Terminal 51 is directly connected to two elements in a twin diode rectifier tube. These elements are the anode 53 in one section of the tube and the cathode 54 in the other section thereof. The cathode 55 opposite anode 53 is positively biased by means of a direct current source 56, the negative terminal of which is connected to ground. The anode 57 which is opposite cathode 54 is connected to the negative terminal of another direct current source 58, the positive terminal of which is grounded. Now, as will readily be understood, the sources 56 and 58 operate to impose certain biases upon the cathode 55 and the anode 57 such that the diode rectifying action will not be effective until the wave peaks of the alternating current reach a certain predetermined level. Above that level on the positive side and below that level on the negative side the biases are overcome and rectifying action takes place so as to limit the output and to produce effectively a rectangular wave in place of a sine wave.

When the deflecting circuits are modulated by potentials drawn through the switch 10 and limited by the diode rectifier of Fig. 3, the resultant image pattern which appears on the screen of the cathode ray tube will be substantially as shown in Fig. 4. Here the result of clipping the peaks of the wave is shown to be such as to produce a semicircular image pattern. The line along the diameter clearly indicates the moment when the rectangular wave shifts from a positive to a negative value. This diametrical line very sharply indicates the 0° angle for the reference voltage, say V1, as shown by the closed outline of the semicircle 59. The semicircular pattern produced by the other alternating voltage V2 is indicated by a broken line semicircle 60. The measurement of the angular difference between the phases of the two voltages is, therefore, easily read on the circular scale. The angle $\theta$ between the diametric outlines of the two semicircles is shown in Fig. 4, for example, to be approximately 52°. This is the angle of phase difference between the two assumed voltages V1 and V2.

Not only does my invention provide for indicating the angle $\theta$ as a measure of phase difference between any two waves, but the particular wave which holds a leading phase relation to the other is also clearly indicated.

Referring now to Fig. 5, I show therein still another supplemental circuit which might alternatively be introduced into the circuit arrangement of Fig. 1 and at the aforementioned point X. Here an input terminal 61 and an output terminal 62 are shown. Terminal 61 is directly connected to the control grid in a triode tube 63, and to an input circuit resistor 64 leading to ground. Another triode tube 66 has its cathode directly connected to the cathode of tube 63. A common cathode resistor 65 is connected between the two cathodes and ground. The function of tube 66 is that of a phase inverter. Its grid is subject to control by potential variations on the anode of tube 63, as will be understood from the fact that the grid of tube 66 and anode of tube 63 are intercoupled across a capacitor 67 and through a resistor 68.

Anode potential is supplied to the tubes 63 and 66 from a D. C. source 74, the positive terminal of which is connected to the anodes through load resistors 75, the negative source terminal being grounded.

Resistor 68 forms a part of a voltage divider, the other units of which are designated 69 and 70. The junction between voltage divider units 69 and 70 is grounded. At the other end of unit 70 is a connection to a capacitor 71 across which output potentials are fed from the tube 66. The unit 70 serves as a load. Push-pull action is obtained in tubes 63 and 66 and the output therefrom is rectified in a twin diode tube 72. The function of this tube 72 is to provide full wave rectification of the voltages impressed as a modulation wave upon the deflecting circuits. This full wave rectification may be understood from the fact that the two anodes in tube 72 are connected in parallel to the output terminal 62 and to ground through a load resistor 73.

Fig. 6 shows the configuration of the patterns which appear on the screen of the cathode ray tube when using the supplemental circuit of Fig. 5 for modulation purposes. Here the pattern traced has somewhat the appearance of airplane propeller blades and, as they are sharply pointed toward the circular scale, the value of the angle $\theta$ may easily be read. The pattern 76 traced by voltage V1 is that against which the 0° angle of the scale should be set. The pattern 77 produced by the voltage V2 may then be read against the scale in degrees. As shown in Fig. 6, by way of example, the angle $\theta$ is approximately 50°.

It is well known that when using a phase shifting device for the purpose of producing circular rotation of the electron beam in the cathode ray tube any adjustment of the phase is correct for only a narrow band of frequencies. If, therefore, the manual control knob for the rheostats 21 and 22 has a pointer movable over a scale which is calibrated in terms of frequencies, then the frequency at which a circular pattern will be produced on the oscilloscope screen may be directly read on that scale. Any departure from the circular pattern can then be corrected until the circular pattern is restored. At that point the frequency of the input voltage is indicated. My invention therefore has this added advantage; that it may be used as a frequency meter as well as a phase meter. If the band of frequencies to be covered requires a greater range of adjustment of the phase shifting network than can be met by the rheostats alone, then substitute capacitors 19 and 20 having a range of values may also be provided.

Another advantage may be derived from the use of my invention when it is desired to compare two voltages of slightly different frequency and to measure their frequency differences. The frequency difference is determined in somewhat the same manner as when using a stroboscope. When the voltages are impressed upon the deflecting circuits alternately and at a rapid rate by means of electronic switching in place of the switch 10, it will be apparent that the patterns traced by the modulation of the deflecting voltages will rotate about the screen. By timing the revolutions of the rotating patterns, that is, the cycles of complete change from phase agreement at one instant to that at a succeeding instant, a measure of frequency difference between the two voltages may be obtained. Thus, if one frequency is known, the other frequency may be derived from the observation.

Other advantages of my invention as well as modifications thereof will readily occur to those skilled in the art in view of the foregoing description. It is to be understood therefore that my invention is not limited in scope by the particular circuit arrangement nor by the particular details thereof as herein described and shown.

I claim:

1. A phase meter comprising two balanced direct current amplifiers, each of the push-pull type, a phase shifting network having input and output terminals and means for so adjusting its impedances as to deliver an output voltage in quadrature phase relation to the input voltage, means for applying input potentials directly to one of said amplifiers and through said network to the other of said amplifiers, a cathode ray oscilloscope having means for rotative deflection of its beam, said means having one deflecting circuit subject to control by one of said amplifiers and a second deflecting circuit subject to control by the other said amplifier, two electric wave sources the phase difference between which is to be determined, one of said sources being coupled to said amplifiers for push-pull control thereof, switching means operative to deliver co-phasal potentials from either of said sources simultaneously to both said amplifiers, thereby to modulate their output, and a circular scale adjacent the screen of said oscilloscope and arranged to set off the phase angle between two image patterns which are respectively produced by the application of said co-phasal potentials from the two said sources successively.

2. A phase meter according to claim 1 wherein said switching means is in circuit with means for producing a substantially rectangular wave characteristic with respect to said co-phasal modulation potentials.

3. A phase meter according to claim 1 wherein said switching means is in circuit with means for producing full-wave rectification of said co-phasal modulation potentials.

4. A phase meter according to claim 1 wherein said co-phasal modulation potentials are effective in combination with said rotative beam deflection means for causing the beam to scan the curve of a cardioid.

5. A phase meter according to claim 1 and including means for causing the electron beam in said oscilloscope to scan the outline of a semicircle, said means including an amplitude limiter having an input terminal connected to said switching means and an output terminal connected to the control electrodes of said amplifiers.

6. A phase meter according to claim 1 and including means for causing the electron beam in said oscilloscope to scan a figure which substantially simulates airplane propeller blades.

7. A phase meter according to claim 1 and including means for causing the electron beam in said oscilloscope to scan a figure which substantially simulates sharply tipped floral petals.

8. A frequency meter comprising a cathode ray oscilloscope, circuits for producing circular rotation of the electron beam in said oscilloscope, said circuits including two push-pull amplifiers each having independent control means for balancing the amplitudes and the potentials of their push-pull outputs, a phase shifting network operative to obtain quadrature phase displacement between the input voltages applied respectively to the one and to the other amplifier, means for varying the impedances of said network thereby to obtain said quadrature phase displacement for any frequency within a predetermined frequency band, and a device for calibrating said impedance varying means in terms of frequency of an applied alternating voltage when that means is adjusted to obtain a circular scanning action in said oscilloscope.

9. A frequency meter according to claim 8 wherein said network is constituted as a four-arm bridge, two arms of which contain adjustable rheostats and the remaining arms of which contain capacitors.

10. A phase meter comprising a cathode ray oscilloscope, circuits for producing circular rotation of the electron beam in said oscilloscope, said circuits including two push-pull amplifiers each having independent control means for balancing the amplitudes and the potentials of their push-pull outputs, an adjustable phase shifting network operative to obtain quadrature phase displacement between the input voltages applied respectively to the one and to the other amplifier, means for applying modulating potentials cophasally to the two input circuits in each said amplifier, said potentials being at the same frequency as that which supplies push-pull potentials thereto, and a circular scale disposed about the screen of said oscilloscope, said scale being settable to align a 0° reference mark thereon with a radial reference axis derived from the electron beam trace under control of one input voltage, another reference axis being indicated radially of said scale when the electron beam trace is made under control of a second input voltage, thereby to measure the angle of phase difference between the two said voltages.

11. A phase meter according to claim 10 and comprising a plurality of stages of amplification in each said push-pull amplifier, and direct current coupling means connecting the output electrodes of one stage to the input electrodes of a succeeding stage.

MILTON DISHAL.

REFERENCES CITED

The following references are of record in the file of this patent:

UNITED STATES PATENTS

| Number | Name | Date |
|---|---|---|
| 2,285,038 | Loughlin | June 2, 1942 |
| 2,411,876 | Hansen | Dec. 3, 1946 |